UNITED STATES PATENT OFFICE.

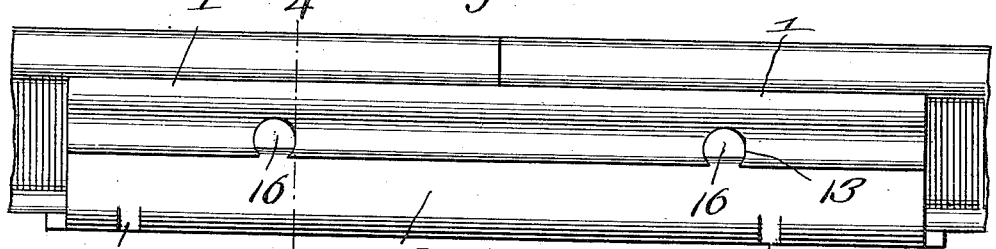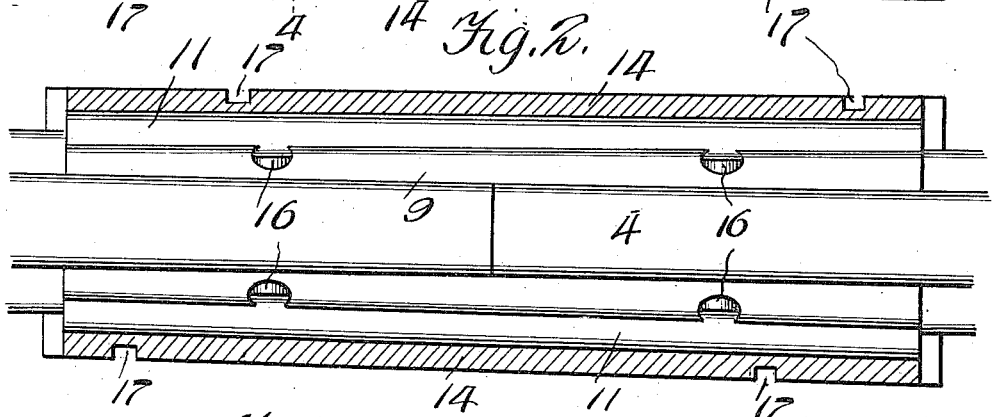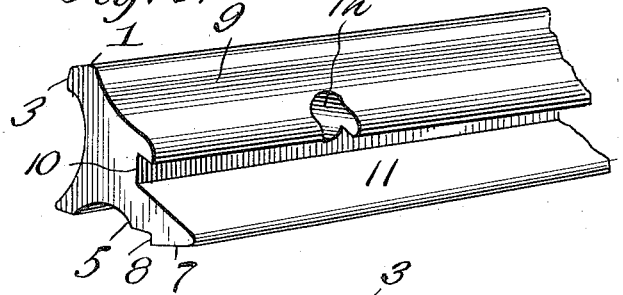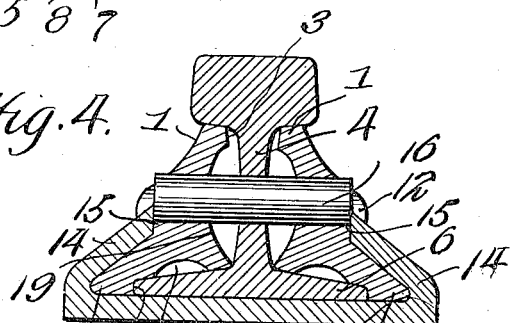

WILLIAM RAPER HUPP, OF NEWPORT, TENNESSEE, ASSIGNOR OF THREE-SIXTEENTHS TO C. E. BURCHFIELD, OF JOHNSON CITY, TENNESSEE, THREE-SIXTEENTHS TO O. B. KEISTER, OF KNOXVILLE, TENNESSEE, AND THREE-SIXTEENTHS TO O. LOWE AND THREE-SIXTEENTHS TO WILLIAM R. McHARGE, OF NEWPORT, TENNESSEE.

SPLICE-BAR.

1,059,874.  Specification of Letters Patent.  Patented Apr. 22, 1913.

Application filed June 4, 1909. Serial No. 500,137.

*To all whom it may concern:*

Be it known that I, WILLIAM RAPER HUPP, a citizen of the United States, residing at Newport, in the county of Cocke and State of Tennessee, have invented new and useful Improvements in Splice-Bars, of which the following is a specification.

The invention relates to an improvement in splice bars designed particularly for connecting and properly supporting the meeting ends of railroad rails.

The main object of the present invention is the provision of a rail splice constructed to include a chair member and fish plates, the fish plates having wedging coöperation with the chair member, and the latter being formed to exert in effect a lifting pressure upon the rail ends, whereby to securely support said rail ends in alined relation and against the possibility of independent movement.

The invention will be described in the following specification, reference being had particularly to the accompanying drawings, in which:—

Figure 1 is a view in side elevation of a rail joint constructed in accordance with my invention. Fig. 2 is a plan of the same with the wedge plates of the chair member in section. Fig. 3 is a broken perspective of one of the fish plates. Fig. 4 is a transverse section on the line 4—4 of Fig. 1.

Referring particularly to the accompanying drawings, wherein is shown the preferred details of construction, the improved rail splice is made up of three parts, duplicate fish plates 1 and a chair member 2. As will be plain from the following description the fish plates are constructed for a wedging action with the rail ends and with the chair member, and the latter is arranged for wedging action with the fish plates.

Each fish plate 1 comprises a suitable length of material having its relatively inner surface 3 approximately of the height of the rail web 4, and its lower surface 5 of a width exceeding that of the width of the base flange 6 of the rail on one side of the web. The lower surface 5 of the fish plate is, at a point coincident with the outer edge of the base flange 6, formed with a depending extension 7, which at its juncture with the lower surface 5 of the plate provides an abrupt shoulder 8 against which the outer edge of the flange 6 is designed to bear when the parts are in applied position. The upper edge 9 of the fish plate is of less width than the thickness of the tread portion or ball of the rail on one side of the web, and the outer surface of the fish plate is formed at an appropriate point with a groove or recess 10 extending throughout the length of the fish plate. Above the groove the outer surface of the fish plate is preferably, though not necessarily, curved, while below the groove the outer surface is extended in alinement with the lower wall of the groove to provide a downwardly and outwardly inclined plane surface 11.

The fish plate as an entirety is wedge-shaped vertically and transversely, that is from the forward end of said plate toward the rear the thickness of the plate between the rear surface 3 and the base or inner wall of the groove 10 is gradually decreased, while the distance or vertical dimension from the plane surface 11 of the plate to the bottom surface 5 is gradually decreased from the front to the rear end of the plate. At appropriate points in its length and in any desired number the fish plate is formed with pin openings 12, which openings include a portion of the inner or base wall of the recess 10, as clearly shown in Fig. 3.

The chair member 2 includes a base plate 13 integral with which and throughout the length of the side edges of said base plate are formed wedge plates 14. These plates incline inwardly and upwardly relative to the base plate and terminate in abrupt edges 15 corresponding in height to the corresponding dimension of the recess 10. The wedge plates 14 are in wedge formation with relation to the base plate 13 and to each other, that is at the forward end of the chair member the relatively inner surfaces of the wedge plates are spaced a slightly greater distance from the upper surface of the base plates than at the rear end of said member, and also the abrupt inner edges 15 of the wedge plates are spaced a slightly greater distance apart at the forward end of the chair member than at the rear end thereof.

Pins 16 are designed to be passed through the alined openings 12 of the fish plates and through suitable and usual expansion openings in the rail wall, the ends of the pins preferably terminating in alinement with the inner or base walls of the recesses 10.

In applying the rail splice the chair is arranged in position to embrace the rail ends, and the fish plates are then applied with the chair in such position as to avoid the final wedging position. The pins 16 are applied holding the fish plates in proper relation to the rail ends, and the chair is then forced to final position. It will be noted that the inner surface of each of the wedge plates 14 of the chair bears squarely on the surfaces 11 of the fish plates while the abrupt edges 15 of said wedge plates fit snugly in the recesses 10 of the fish plates. As the chair member is driven to final position the wedging coöperation insures a tight and effective fitting of the parts, that is the wedging coöperation between the edges 15 of the wedge plates and the inner or bottom walls of the recesses 10 will force the fish plates into binding contact with the rail web, at the same time tending in a measure to slightly lift the fish plates so as to cause their upper edges 9 to bear with a proper supporting contact beneath the balls of the rails. The wedging action between the inner surface of the wedge plates and the surface 11 of the fish plates tends to force said fish plates firmly onto the base flanges of the rail and by means of the shoulders 8 firmly hold the base flanges of the rails in alined position.

As the abrupt edges 15 of the wedge plates partly overlie the openings 12 in the fish plates it will be obvious that said edges 15 will prevent the accidental displacement of the pins 16. The chair member is preferably provided with spike openings 17, whereby the member may be secured to the underlying ties to prevent accidental movement, and the relatively inner and lower surfaces of the fish plates are preferably cut out, as at 19, to reduce the weight of the parts.

In the construction described the meeting ends of the rails are held absolutely in relatively fixed position. Independent movement of such rail ends to disturb their normal alinement is impossible. The wedging action of the parts effectively supports the balls of the rails and binds the fish plates into such contact with the rails at all points as to render the use of the usual securing bolts entirely unnecessary. Economy of time in the application of the splice as well as of material and expense in dispensing with the securing bolts is therefore an important feature of the present invention from a practical standpoint.

Having thus described the invention what is claimed as new, is:—

A rail splice including a chair member and fish plates coöperating therewith, said fish plates being formed with a surface wedge shaped transversely of said plates and with a second surface wedge shaped longitudinally of the plates, the chair member being provided with a plate to coöperate with both of said wedge surfaces, said plate being wedge shaped longitudinally and transversely of the chair member, the fish plates being formed to bear throughout against the outer edge of the base flanges of the rails, whereby in the wedging action said base flange is gripped between the fish plates.

In testimony whereof I affix my signature in presence of two witnesses.

WILLIAM RAPER HUPP.

Witnesses:
D. W. GOULD,
GEORGE M. BOND.

---

Copies of this patent may be obtained for five cents each, by addressing the "Commissioner of Patents, Washington, D. C."